Aug. 14, 1956 P. J. DONALD ET AL 2,758,476
ELECTRICAL APPARATUS FOR MEASURING PRESSURE
Filed Dec. 3, 1952

INVENTORS.
PHILIP J. DONALD
E. VICTOR LARSON
BY Arthur H. Swanson
ATTORNEY.

United States Patent Office 2,758,476
Patented Aug. 14, 1956

2,758,476

ELECTRICAL APPARATUS FOR MEASURING PRESSURE

Philip J. Donald, Woodbury, N. J., and Erland Victor Larson, Elkins Park, Pa., assignors to Minneapolis-Honeywell Regulator Company, Minneapolis, Minn., a corporation of Delaware Application December 3, 1952, Serial No. 323,826

8 Claims. (Cl. 73—398)

The general object of the present invention is to provide an improved apparatus for measuring a fluid pressure.

More specifically, the object of the invention is to provide improved hydrostatic apparatus for measuring a variable fluid pressure by balancing that pressure against a vapor pressure generated by the evaporation of water or other liquid which is vaporized by a heating action automatically varied as required to maintain said balance. A still more specific object of the invention is to provide an electric heating current flow path of novel form and characterized by its inclusion of liquid and metallic portions to form an elongated portion of said flow path which varies in its resistance to current flow in predetermined accordance with changes in the pressure measured.

The various features of novelty which characterize our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described preferred embodiments of the invention.

Figure 1:
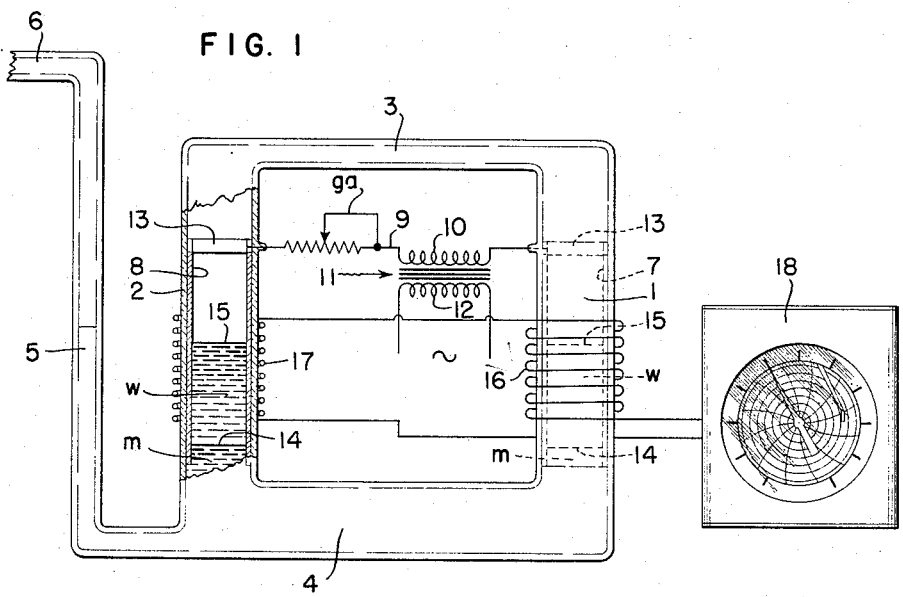
Fig. 1 is a diagrammatic illustration of one embodiment of the invention.

The measuring apparatus shown diagrammatically in Fig. 1 comprises two side by side uprising tubular elements 1 and 2 which serve as fluid heating chambers. The elements 1 and 2 have their upper ends connected by a tubular element 3 which serves as a vapor chamber. The lower ends of the heating chambers 1 and 2 are connected by conduit means providing a liquid seal for the lower end of each heating chamber and an elevated inlet for the pressure fluid which is to be measured. As shown, in Fig. 1, said conduit means comprises a horizontal conduit portion 4 beneath and directly connected to the lower ends of the chambers 1 and 2, and an uprising conduit portion 5 connected to or forming an inlet 6 for fluid under the pressure which is to be measured.

As shown, the heating chambers 1 and 2 are provided with an electrically conductive coating in the form of thin, internal, metallic oxide coatings 7 and 8, each of which serves as an electrical conductor having a definite and substantial resistance per unit of length. The upper ends of the coatings 7 and 8 are connected by a conductor 9. As shown, the conductor 9 includes the secondary winding 10 of a transformer 11. The latter has a primary winding 12 for connection to a suitable source of alternating current, which may be of conventional voltage and frequency, for example, 115 volts and 60 cycles per second. Inasmuch as the coatings 7 and 8 may be very thin, each of those coating may be connected at its upper end to an internal metallic ring or band 13 of substantially greater thickness than the coatings 7 and 8. The ends of the conductor 9 are electrically connected to the bands 13 by conductor portions extending through the walls of the chambers 1 and 2. Those walls and also the walls of the chamber and sections 3, 4, 5 and 6 may be integrally connected tubular glass sections. Any non porous vitreous ceramic will be satisfactory.

In Fig. 1, the lower portions of the chambers 1 and 2, the conduit 4, and the lower portion of the uprising conduit 5, are filled with an electrically conductive or short circuiting liquid $m$ having a high specific gravity and a high boiling point. In practice the liquid $m$ is mercury.

The portions of the heating chambers 1 and 2 immediately above the mercury in those sections are filled with a volatile liquid $w$ which may well be, and is hereinafter assumed to be distilled water having a very high electrical resistance. The conductor 9, transformer winding 10, metallic coatings 7 and 8 and mercury $m$ filling the lower end portions of the chambers 1 and 2 of the conduit 4, form a heating circuit. The resistance of that circuit varies in response to changes in pressure measured, as is hereinafter explained.

In Fig. 1, the line 14 represents the surface level of the mercury in each of the heating chambers 1 and 2 under an assumed normal of zero position. Under that assumed condition, alternating current is supplied to the transformer 11 at a constant normal rate and the pressure in the inlet 6 has a normal value which may be equal to the pressure of the atmosphere under assumed standard conditions. Under the assumed normal conditions, the body of water in each of the chambers 1 and 2 is sufficient to extend upward from the level 14 to a predetermined upper level 15 which is some distance below the corresponding band or ring 13. On an increase in the pressure in the inlet 6 the upper surface levels of the mercury and water bodies $m$ and $w$ in the chambers 1 and 2 rise.

The direct initial effect of a rise of the mercury in the heating chambers 1 and 2 above the lines 14 is an increase in the conductivity of the heating circuit. The water bodies $w$ in contact with the conductive coatings 7 and 8, do not affect the resistance of the heating circuit. However, the rise in the surface level of the mercury in the heating chambers 1 and 2 directly reduces the resistance of the circuit, since the resistance of the mercury portion then above each level line 14 is only a small fraction of the resistance of the portion of the corresponding conductive coating 7 or 8 which is short circuited by the mercury portion above said line. The electric coatings 7 and 8, through which the terminal rings 13 are electrically connected to the mercury, may constitute substantially all of the resistance in the heating circuit except that provided by the rheostatic resistance $ga$ included in the conductor 9 for calibrating purposes.

An indirect effect of the rise of the mercury in the chambers 1 and 2 above the line 14, and the resultant increase in the current flow in the heating circuit, is an increase in the vapor pressure in the chamber 3. That vapor pressure increase is a direct result of the rise in temperature of the water bodies $w$. The vapor pressure increase is a follow-up action which materially reduces the extent of rise in the surface level of the mercury above the lines 14 produced by a given rise in the pressure in the inlet 6 above its normal or zero value.

As will be apparent, the magnitude of the electric current flow in the heating circuit depends upon the pressure in the inlet 6. This current flow produces a temperature in the chambers 1 and 2 which is proportional to pressure on the input. In the form of the invention shown in Fig. 1, a measure of the electric current flow through the heating chambers 1 and 2 is obtained by means of a measuring circuit which includes a pair of temperature responsive coils 16 and 17 surrounding portions of the chambers 1 and 2 and connected in series with one another across the terminals of an electric instrument 18 which may be of any usual or suitable type for measuring changes in the electrical resistance of the circuit. A showing of an instrument suitable for use with a variable resistance input is in the Wills Patent, 2,423,540, issued July 8, 1947. Thus, the temperature measure for the coils 16 and 17 will be recorded on the meter 18 which may be calibrated in pressure.

The apparatus shown in Fig. 1 is characterized by its mechanical simplicity and low inherent construction cost. The apparatus, other than the meter 18, includes no movable elements except the mercury and water in the chambers or sections 1—5. An arrangement of the present type permits a continuous or uninterrupted measure of the pressure in tube 6 to thus enhance the accuracy and stability of the apparatus. The apparatus is advantageously characterized in particular, by the relatively great length of the portion of the heating circuit within the chambers 1 and 2 formed by the portion of the conductive coatings 7 and 8 which are not short-circuited by the mercury in said chambers, and by the considerable magnitude of the effective resistance in the heating circuit which may be reduced as the fluid pressure to be measured increases from its minimum to its maximum value. The simplicity of the fluid containing apparatus and the fact that it may be made of glass contribute to low production costs. The chambers 1, 2 and 3 may consist initially of sections of a single straight glass tube of uniform cross section, and may be drawn to reduce the cross section of the vapor section 3. The conductive coating 7 and 8 may be readily applied in well known manner while the corresponding portions of the glass tube is in its original straight condition. Thereafter the glass may be heated and bent into U form after which the ends of the U shaped portion may be fused to the tube portion forming the section 4 of the apparatus shown in Fig. 1. The high resistance conductors 7 and 8 may take other forms. In particular each of those coatings may be replaced by a resistor wire suitably placed in the chambers and connected at its upper end to the corresponding end of the conductor 9 and having its lower end extending into the subjacent mercury body $m$.

Figure 2:
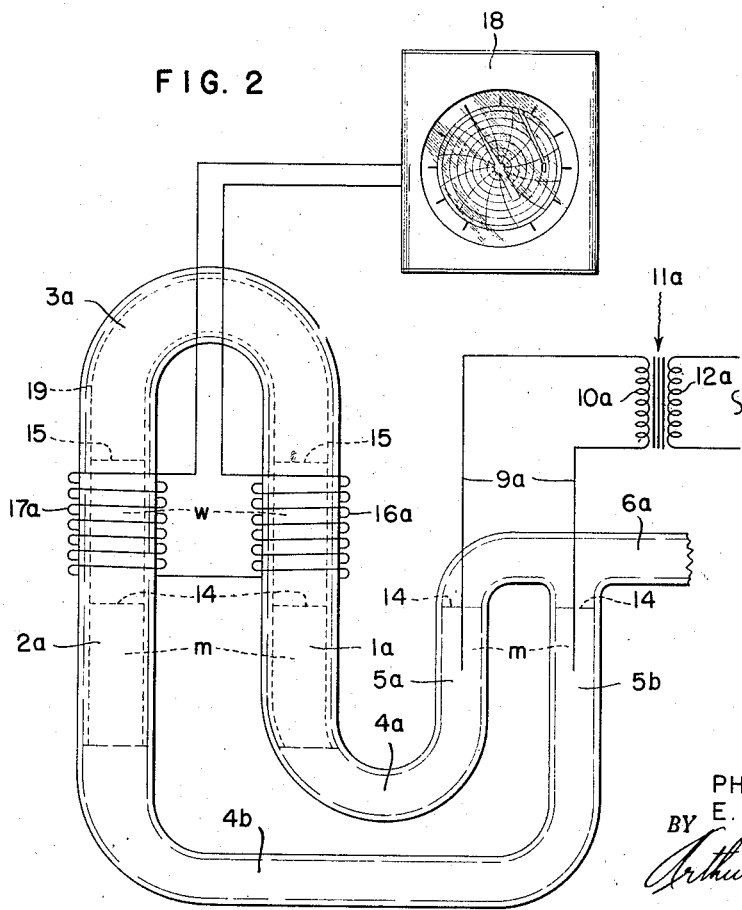
Fig. 2 is a diagrammatic illustration of a modification of the portion shown in Fig. 1.

The invention may take various forms and a modified form of the Fig. 1 apparatus is shown by way of example, in Fig. 2. The apparatus shown in Fig. 2 comprises heating chambers 1a and 2a and a vapor chamber 3a connecting the upper end of the chambers 1a and 2a, which may be respectively similar in form and operative characteristics to the Fig. 1 chambers 1, 2 and 3.

The lower end of the chamber 1a is connected to the upper end of one leg of a U-shaped tube 4a having a longer second leg 5a. Similarly, the lower end of the section 2a is connected to the upper end of one leg of a U-shaped tube 4b having a longer second leg 5b. The upper ends of the second legs of the tubes 4a and 4b are connected to one another and to the inlet 6a for the pressure fluid to be measured. The lower portions of the chambers 1a and 2a and the U tubes 4a and 4b, contain mercury $m$, and portions of the chambers 1a and 2a above the mercury contain water $w$. The lines 14 and 15 indicate normal or zero mercury and water levels in Fig. 2 as in Fig. 1. The longer legs of the U tubes 4a and 4b are connected to one another and to the tube 6a at a level above the maximum level of the mercury in those legs which can exist in normal operation. The walls of the chambers 1a, 2a and 3a and tubes 4a, 4b and 6a may be formed of glass.

A conductor 9a including the secondary winding 10a of the transformer 11a is shown as connected between the mercury in the second leg of the tube 4a and the mercury in the second leg of the tube 4b. As shown in Fig. 2, the mercury bodies $m$ in the chambers 1a and 2a are electrically connected by a continuous conductive coating 19 having a substantial resistance for unit of length, and applied to the inner walls of the chambers 1a, 2a and 3a. The tubes 1a and 2a are surrounded by measuring coils 16a and 17a, respectively, which may be connected in series to a meter 18 as are the coils 16 and 17 shown in Fig. 1. The heater resistance path in Fig. 2 may be traced from the power transformer winding 10a through the left lead 9a, the mercury in tube 5a and 4a, resistance coating 19 in tube 1a, 3a, and 2a, the mercury in tubes 4b and 5b, back to the right lead 9a and winding 10a. As will be apparent to those skilled in the art without further explanation, the operation of the apparatus shown in Fig. 2 is analogous to the operation of the apparatus shown in Fig. 1. The calibration of the apparatus of either of Figs. 1 or 2, for accurate measurements, should take into account the differences in the heights of the liquids in the chamber 1 and 2 and tube 5. This may be conveniently accomplished in the circuits of instrument 18 in a well known manner.

While in accordance with the provisions of the statutes, we have illustrated and described the best forms of embodiment of our invention now known to us, it will be apparent to those skilled in the art that changes may be made in the forms of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent, is as follows:

1. Measuring apparatus comprising in combination a chambered structure including an upper vapor space, a subjacent chamber open at its upper end to said vapor space, a conduit having one end connected to the lower portion of said chamber and extending upward therefrom, a body of electrically short circuiting liquid filling lower portions of said chamber and said conduit, a body of volatile non-conductive liquid in said chamber above and supported by said short circuiting liquid, an elongated resistor in said chamber having its upper end above said volatile liquid body and having its lower end immersed in said short circuiting liquid and directly contacting said volatile liquid in an intermediate region, a heating circuit including said resistor and including an electric current source, whereby a variable fluid pressure transmitted to the upper end of said conduit raises and lowers the upper surface levels of the short circuiting liquid and volatile liquid in said chamber as said pressure respectively increases and decreases and thereby respectively decreases and increases the resistance of said circuit and respectively increases and decreases the temperature of the volatile liquid, and temperature responsive means associated with said chamber and providing a measure of the pressure in said conduit.

2. Measuring apparatus as specified in claim 1, in which said elongated resistor comprises a coating of resistance material on the walls of said chambered structure and the increase in the temperature of the volatile liquid increases the vapor pressure in said vapor space and thereby creates a follow-up action which reduces the magnitude of the increase in height of the short circuiting liquid surface level produced by a given increase in said pressure.

3. Measuring apparatus as specified in claim 1, in which the chambered structure includes a second chamber alongside and similar to the first mentioned chamber in its connections to said vapor space and conduit and in its inclusion of electrical short circuiting liquid, volatile liquid and a resistor, the latter being connected in series with the first mentioned resistor in said heating circuit.

4. Measuring apparatus as specified in claim 1, in which the current flowing in said heating circuit is alternating current, and in which the means providing a measure of the current flow in said circuit includes a meter circuit having on the input thereof a temperature sensitive resistor positioned adjacent said chambered structure and whose temperature change is a measure of the pressure in said conduit.

5. In apparatus for continuously measuring an input pressure, the combination comprising, an enclosed chamber having the walls thereof coated with an electrical resistance material, a conducting liquid of negligible resistance filling a portion of said chamber and arranged to rise and fall in said chamber in accordance with an input pressure change to variably shunt a portion of said material, a source of power connected to said resistance material to heat that portion of said material which is not shunted by said liquid, a volatile liquid in said chamber above said conducting liquid and arranged to be heated by said resistance element so as to produce in said chamber a vapor pressure proportional to the temperature produced in said volatile liquid by the heat of said resistance material, said vapor pressure opposing said input pressure, and temperature responsive means associated with said chamber for indicating a temperature in said apparatus related to the vapor pressure produced by the heat of said resistance material.

6. Pressure measuring apparatus, comprising, an enclosed chamber having therein an exposed electrical resistance heater element, a conducting liquid having negligible resistance which is arranged to rise and fall over said element to shunt said element in accordance with the magnitude of an input pressure, a source of power supplying energy to said element to cause said element to heat said chamber in accordance with the amount said element is shunted, temperature expansive means comprising a second volatile liquid which is electrically nonconducting in said chamber engaging said liquid and responsive to the heat in said chamber and producing in said chamber a vapor pressure proportional to the temperature of said chamber to oppose said input pressure and change the level of said conducting liquid on said element, and chamber temperature responsive means for indicating the magnitude of said input pressure.

7. Apparatus for continuously measuring an input pressure, comprising in combination, an enclosed chamber having therein an exposed electrical heater element, a source of power for said heater element, a liquid having electrical short circuiting properties which is arranged to rise and fall in said chamber in accordance with changes in said input pressure to vary the heating effect of said element by variably short circuiting said element, a temperature expansible means comprising a nonconducting liquid in said chamber over said first liquid and responsive to the heating effect of said element, said expansible means engaging said liquid and producing a vapor pressure in said chamber proportional to the temperature of said chamber and acting in opposition to said input pressure to balance said input pressure, and temperature responsive means associated with said chamber indicating the temperature of the chamber which is proportional to said input pressure.

8. Apparatus as set forth in claim 7 wherein said electrical heater element comprises a metallic oxide coating on said chamber and said liquid having electrical short circuiting properties is mercury.

References Cited in the file of this patent

UNITED STATES PATENTS

| 2,459,268 | Elkins | Jan. 18, 1949 |
| 2,566,369 | Putman | Sept. 4, 1951 |

FOREIGN PATENTS

| 759,859 | France | Dec. 6, 1933 |

OTHER REFERENCES

Physical Society of London, Proceeding, Vincent et al., vol. 51, November 1939, pp. 1003, 1004.